(12) United States Patent
Kobayashi et al.

(10) Patent No.: US 8,770,062 B2
(45) Date of Patent: Jul. 8, 2014

(54) PULSER PLATE MOUNTING STRUCTURE

(75) Inventors: Teruo Kobayashi, Wako (JP); Takeru Hamakawa, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 1006 days.

(21) Appl. No.: 12/524,515

(22) PCT Filed: Jan. 29, 2008

(86) PCT No.: PCT/JP2008/051252
§ 371 (c)(1),
(2), (4) Date: Jul. 24, 2009

(87) PCT Pub. No.: WO2008/093656
PCT Pub. Date: Aug. 7, 2008

(65) Prior Publication Data
US 2010/0065006 A1 Mar. 18, 2010

(30) Foreign Application Priority Data

Feb. 2, 2007 (JP) .................. 2007-024290
Feb. 2, 2007 (JP) .................. 2007-024291
Feb. 2, 2007 (JP) .................. 2007-024292

(51) Int. Cl.
*F16C 3/04* (2006.01)

(52) U.S. Cl.
USPC ........................................ 74/603

(58) Field of Classification Search
USPC ............. 74/579 E, 589, 595, 603; 123/192.1, 123/406.58
See application file for complete search history.

(56) References Cited

FOREIGN PATENT DOCUMENTS

| JP | 61-21407 | 1/1986 |
| JP | 62-225151 | 10/1987 |
| JP | 6-26104 | 7/1994 |
| JP | 9-53687 | 2/1997 |
| JP | 10-331681 | 12/1998 |
| JP | 2001-165609 | 6/2001 |
| JP | 2003-172168 | 6/2003 |
| JP | 2006-153107 | 6/2006 |
| JP | 2006-153686 | 6/2006 |

OTHER PUBLICATIONS

International Search Report for Application No. PCT/JP2008/051252, dated Apr. 15, 2008.

*Primary Examiner* — Vicky Johnson
(74) *Attorney, Agent, or Firm* — Nelson Mullins Riley & Scarborough LLP; Anthony A. Laurentano

(57) ABSTRACT

A pulser plate mounting structure is provided in which a key groove (14) is formed in a mounting face (10) of a rotating wall portion (9) formed from a crank arm (3) and a counterweight (4), a key portion (16) for engaging with the key groove (14) is formed on a pulser plate (P) that is superimposed on the mounting face (10), and this pulser plate (P) is secured to the rotating wall portion (9) by means of a securing member (18), wherein the key portion (16) is formed from an arched band-shaped portion (16a) projecting in an arched shape from the pulser plate (P) on one end face side thereof and engaging with the key groove (14), and a pair of connecting portions (16b) for providing integral connection between the pulser plate (P) and opposite ends of the arched band-shaped portion (16a). This provides a high precision of positioning of the pulser plate relative to the crankshaft and a good productivity for the pulser plate.

12 Claims, 15 Drawing Sheets

US 8,770,062 B2

PULSER PLATE MOUNTING STRUCTURE

RELATED APPLICATIONS

This application is a 35 U.S.C. 371 national stage filing of International Application No. PCT/JP2008/051252, filed 29 Jan. 2008, which claims priority to Japanese Patent Application No. 2007-024290, Japanese Patent Application No. 2007-024291, and Japanese Patent Application No. 2007-024292, all filed on 2 Feb. 2007 in Japan. The contents of the aforementioned applications are hereby incorporated by reference.

TECHNICAL FIELD

The present invention relates to an improvement of a pulser plate mounting structure in which a key groove is formed in an end face of a rotating wall portion formed from a crank arm and a counterweight of a crankshaft for an internal combustion engine, a key portion for engaging with the key groove is formed on a pulser plate that is superimposed on the end face, and this pulser plate is secured to the rotating wall portion by means of a securing member.

BACKGROUND ART

Such a pulser plate mounting structure is already known, as disclosed in Patent Publication 1.
Patent Publication 1: Japanese Patent Application Laid-open No. 10-331681

DISCLOSURE OF INVENTION

Problems to be Solved by the Invention

In such a conventional pulser plate mounting structure, the key portion is formed from an L-shaped bent portion that is punched upwardly from the pulser plate on one end face side thereof; since such a key portion is cantilever-supported on the pulser plate, the rigidity is low, and it is difficult to enhance the precision with which the pulser plate is positioned relative to the crankshaft. Moreover, since it is necessary to subject a sharp extremity of the key portion that is cut away from the pulser plate to a finishing process such as chamfering, the number of machining steps is large, and it cannot be said that the productivity is good.

The present invention has been accomplished in the light of such circumstances, and it is an object thereof to provide a pulser plate mounting structure of the above type for which the precision with which a pulser plate is positioned relative to a crankshaft is high and the productivity of the pulser plate is good.

Means for Solving the Problems

In order to attain the above object, according to a first aspect of the present invention, there is provided a pulser plate mounting structure in which a key groove is formed in an end face of a rotating wall portion formed from a crank arm and a counterweight of a crankshaft for an internal combustion engine, a key portion for engaging with the key groove is formed on a pulser plate that is superimposed on the end face, and this pulser plate is secured to the rotating wall portion by means of a securing member, characterized in that the key portion is formed from an arched band-shaped portion projecting in an arched shape from the pulser plate on one end face side thereof and engaging with the key groove, and a pair of connecting portions for providing integral connection between the pulser plate and opposite ends of the arched band-shaped portion.

The end face of the rotating wall portion corresponds to a mounting face 10 of an embodiment of the present invention that will be described later, the securing member corresponds to a bolt 18, and a securing part corresponds to a recess 12 and a boss 15.

According to a second aspect of the present invention, in addition to the first aspect, the arched band-shaped portion is disposed so that longitudinal direction thereof is along a radius of the pulser plate.

According to a third aspect of the present invention, in addition to the first aspect, the key groove and the arched band-shaped portion, which engage with each other, are disposed so that longitudinal directions thereof are along a radius of the pulser plate.

According to a fourth aspect of the present invention, in addition to the first aspect, long holes are bored in the pulser plate, opposite side faces of the arched band-shaped portion facing the long holes.

According to a fifth aspect of the present invention, in addition to the first aspect, there are a plurality of locations at which there are securing parts for securing the pulser plate to the rotating wall portion by the securing member, the locations being aligned in a peripheral direction of the pulser plate, and gaps in a peripheral direction between at least one location of the securing parts and other locations of the securing parts adjacent to opposite sides of the one location of the securing parts are made to be different from each other.

According to a sixth aspect of the present invention, in addition to the first aspect, a plurality of recesses are formed in the end face of the rotating wall portion so as to be aligned in a peripheral direction thereof, a plurality of bottomed tubular bosses housed in the plurality of recesses are formed on the pulser plate, these bosses being secured to the pulser plate by the securing members, and a tubular portion of the boss is formed in an irregular cylindrical shape so that a minor axis is directed in a peripheral direction of the pulser plate and a major axis is directed in a radial direction of the pulser plate.

According to a seventh aspect of the present invention, in addition to the sixth aspect, the tubular portion of the boss is formed in an elliptical tubular shape.

According to an eighth aspect of the present invention, in addition to the sixth aspect, the curvature of a bent portion connected to opposite ends of the tubular portion of the boss is set so as to be smaller on the minor axis side than on the major axis side.

According to a ninth aspect of the present invention, in addition to the first aspect, a rib is formed on the pulser plate, the rib projecting on one end face side thereof and extending in a peripheral direction.

According to a tenth aspect of the present invention, in addition to the ninth aspect, the rib projects from an end face of the pulser plate on the rotating wall portion side, and a rib-housing groove for housing the rib is formed in the rotating wall portion.

According to an eleventh aspect of the present invention, in addition to the ninth aspect, the rib is formed in an annular shape so as to extend along the entire periphery of the pulser plate.

According to a twelfth aspect of the present invention, in addition to the ninth aspect, a plurality of recesses are formed in the end face of the rotating wall portion so as to be aligned in a peripheral direction thereof, a plurality of bottomed tubular bosses are formed on the pulser plate, the bosses being housed in the plurality of recesses and secured to the pulser plate by the securing members, these bosses are connected to each other via the annular rib projecting from the end face of the pulser plate on the rotating wall portion side, and a rib-housing groove for housing the annular rib is formed in the end face of the rotating wall portion.

According to a thirteenth aspect of the present invention, in addition to the ninth aspect, a height of the rib is set so as to be smaller than a height of the boss, and a depth of the rib-housing groove is set so as to be smaller than a depth of the recess for housing the boss.

According to a fourteenth aspect of the present invention, in addition to the ninth aspect, a through hole is bored in a half of the pulser plate on the crank arm side.

Effects of the Invention

In accordance with the first aspect of the present invention, since the key portion is formed from the arched band-shaped portion projecting in an arched shape from the pulser plate on one end face side thereof and engaging with the key groove, and the pair of connecting portions for providing integral connection between the pulser plate and opposite ends of the arched band-shaped portion, the key portion is doubly supported on the pulser plate and therefore has high rigidity, and consequently by cooperation with the key groove the precision with which the pulser plate is positioned relative to the crankshaft can be enhanced. Moreover, the doubly-supported key portion does not have a sharp extremity, after press-forming it is unnecessary to carry out a finishing process such as chamfering, and the productivity of the pulser plate can be improved.

In accordance with the second aspect of the present invention, side faces of the key groove and the arched band-shaped portion extending in the radial direction of the pulser plate abut against each other over a wide area, thus enabling a predetermined peripheral position of the pulser plate relative to the crankshaft to be maintained more accurately.

In accordance with the third aspect of the present invention, since the counterweight has a wide end face that overlaps the pulser plate, the key groove can be formed easily without thickening the end face. Therefore, the degree of freedom in design is high, the productivity is good, and it is possible to prevent the weight balance from being lost due to the crankshaft being thickened.

In accordance with the fourth aspect of the present invention, press-forming of the arched band-shaped portion of the key portion can be carried out easily without it being resisted by the pulser plate main body.

In accordance with the fifth aspect of the present invention, the position at which the pulser plate is mounted on the rotating wall portion of the crankshaft is limited to one location, misassembly can be prevented, and it is therefore possible to prevent the key portion from being damaged by misassembly.

In accordance with the sixth aspect of the present invention, since the tubular portion of the boss of the pulser plate is formed in an irregular cylindrical shape in which its minor axis is directed in the peripheral direction of the pulser plate and its major axis is directed in the radial direction of the pulser plate, when vibration is generated in the plate-shaped portion between adjacent bosses of the pulser plate while the engine is running, the vibration is transmitted to the peripheral edge portion of the irregular cylindrical shape portion within the range of the major axis, stress due to the vibration is therefore widely dispersed in the peripheral edge portion of the irregular cylindrical shape portion within the range of the major axis, and the durability of the area around each boss can be improved.

In accordance with the seventh aspect of the present invention, since the change in curvature of the elliptical tubular portion of the boss of the pulser plate is very smooth, dispersion of stress is ideal, and the durability of the area around each boss can be enhanced effectively.

In accordance with the eighth aspect of the present invention, since the curvature of the bent portion connected to opposite ends of the tubular portion of the boss of the pulser plate is set so that it is smaller on the minor axis side than on the major axis side, when vibration occurs in the plate-shaped portion between adjacent bosses of the pulser plate, stress concentrated in particular on the minor axis side of the boss, that is, on the peripheral edge portion in the peripheral direction of the pulser plate, can be dispersed more widely, and the durability of the area around each boss can be further enhanced.

In accordance with the ninth aspect of the present invention, since the rib is formed on the pulser plate so as to project from one end face side thereof and extend in the peripheral direction, the rigidity of the pulser plate can be increased by the rib, and vibration of the pulser plate can be suppressed effectively. Moreover, since it is not necessary to specially increase the thickness of the pulser plate, this contributes to a reduction in the weight of the crankshaft system, and when the pulser plate is secured to the rotating wall portion, since it is not necessary to specially increase the number of locations at which it is secured, the degree of freedom in design is high.

In accordance with the tenth aspect of the present invention, since the rib projects from the end face of the pulser plate on the rotating wall portion side, and the rib-housing groove for housing the rib is formed in the rotating wall portion, the rib does not project from the outer end face of the pulser plate, and it is therefore possible to arrange the pulser plate in the proximity of a crankcase inner wall.

In accordance with the eleventh aspect of the present invention, since the rib is formed in an annular shape so as to extend along the entire periphery of the pulser plate, the rigidity of the pulser plate can be increased evenly along the entire periphery thereof, and vibration of the pulser plate can be suppressed effectively.

In accordance with the twelfth aspect of the present invention, since the rib is formed in an annular shape and provides a connection between a plurality of high rigidity bosses, the rigidity of the pulser plate can be further increased more effectively by cooperation of the annular rib and the plurality of bosses, and vibration of the pulser plate can therefore be suppressed more effectively.

In accordance with the thirteenth aspect of the present invention, since the height of the rib is set so as to be smaller than the height of the boss, the rigidity of the connecting portion between the rib and the boss can be increased, and the rigidity of the pulser plate can be further improved. At the same time, since the depth of the rib-housing groove is set so as to be smaller than the recess for housing the boss, the rib-housing groove and the recess can easily be cut in the mounting face of the rotating wall portion without them interfering with each other, and the ease of machining is good.

In accordance with the fourteenth aspect of the present invention, since the through holes are bored in the half of the pulser plate on the crank arm side, the weight of the half of the pulser plate on the crank arm side can be reduced by these through holes, the counterweight can be thinned by a corresponding amount, and the weight of the crankshaft system can be reduced.

The above-mentioned objects, other objects, features, and advantages of the present invention will become apparent from explanation of preferred embodiments described in detail below by reference to the attached drawings.

BEST MODE FOR CARRYING OUT THE INVENTION

Preferred embodiments of the present invention are explained below by reference to the attached drawings.

Embodiment 1

Figure 1:
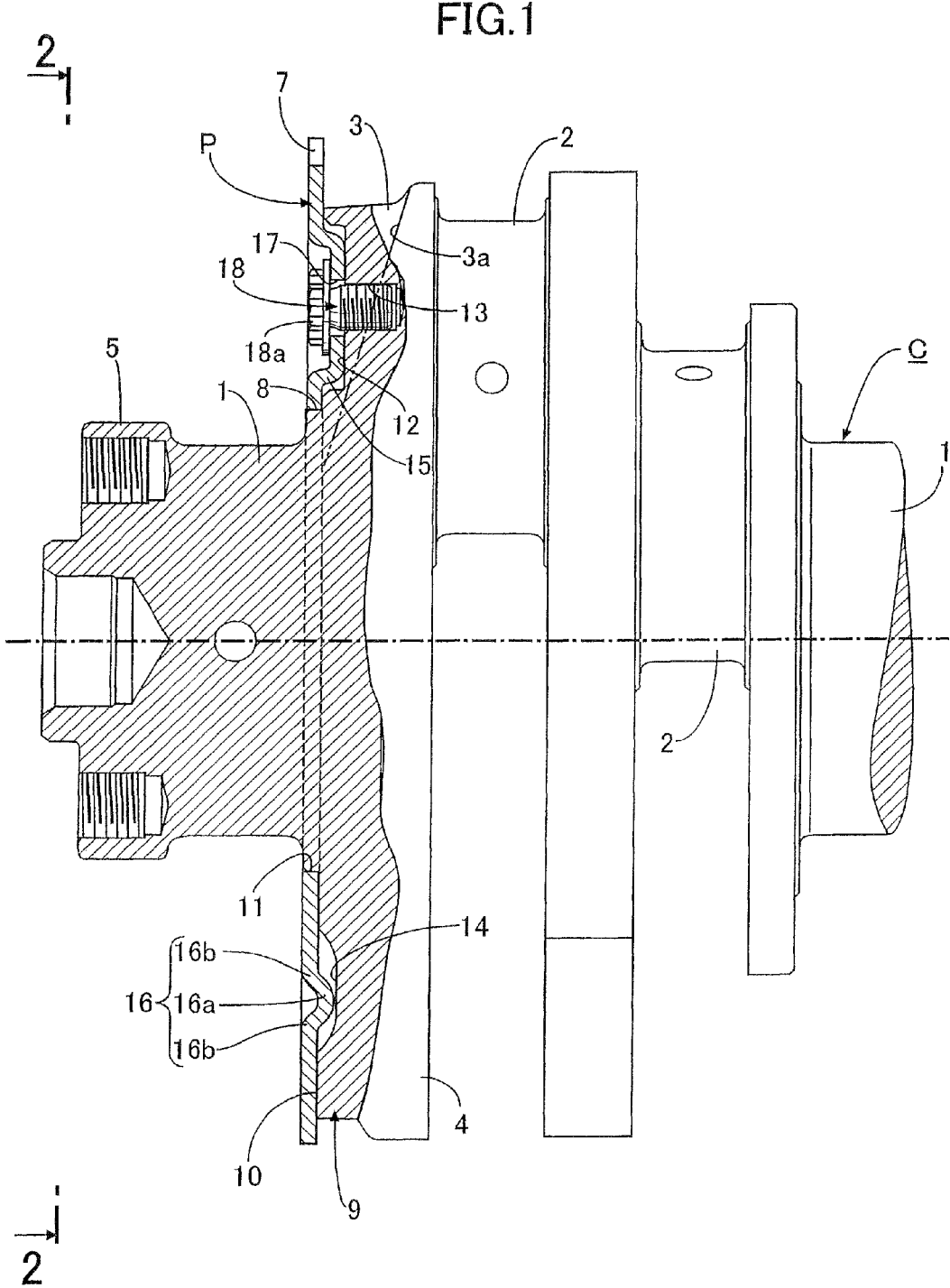
FIG. 1 is a sectional side view of an essential part of a crankshaft for an internal combustion engine equipped with a pulser plate mounting structure related to a first embodiment of the present invention. (first embodiment)
Figure 2:
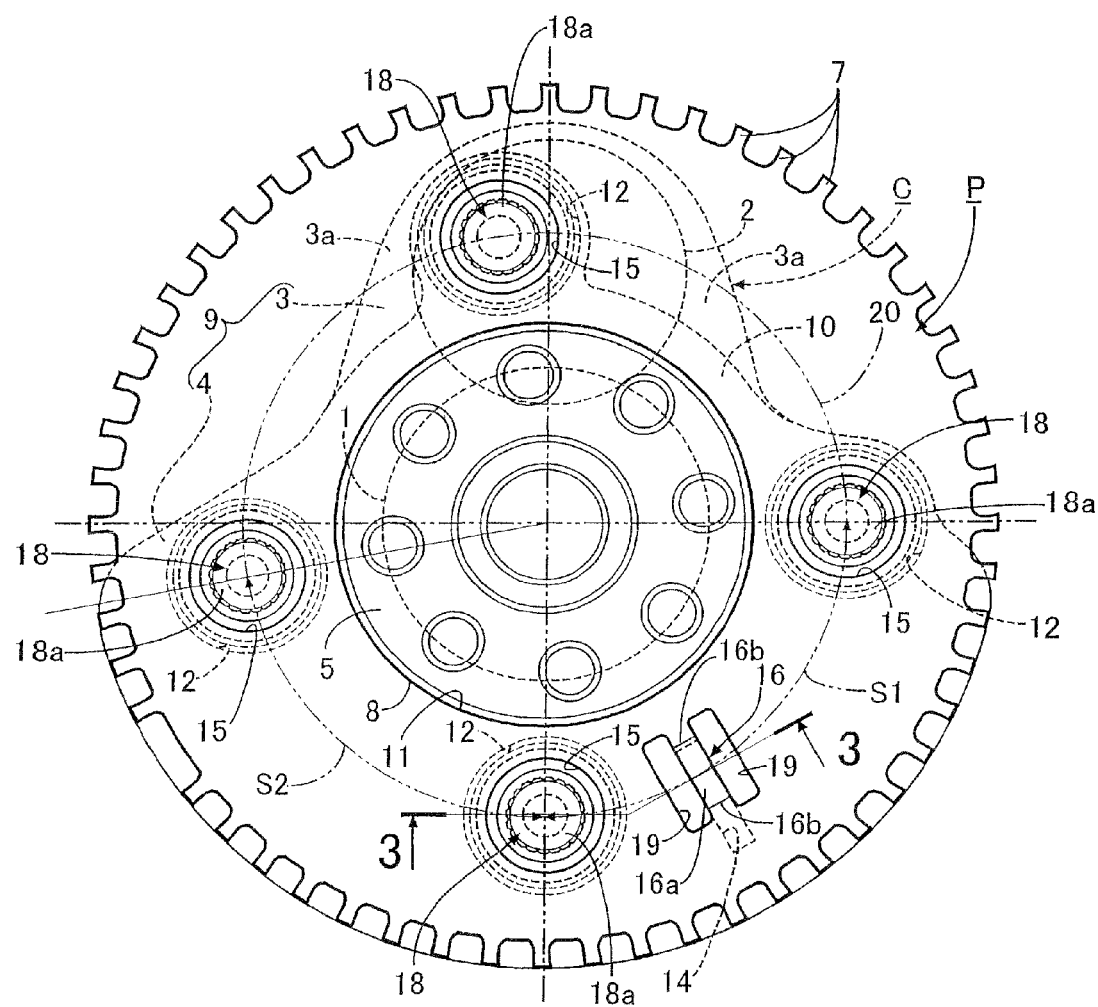
FIG. 2 is a view from arrow 2 in FIG. 1. (first embodiment)
Figure 3:
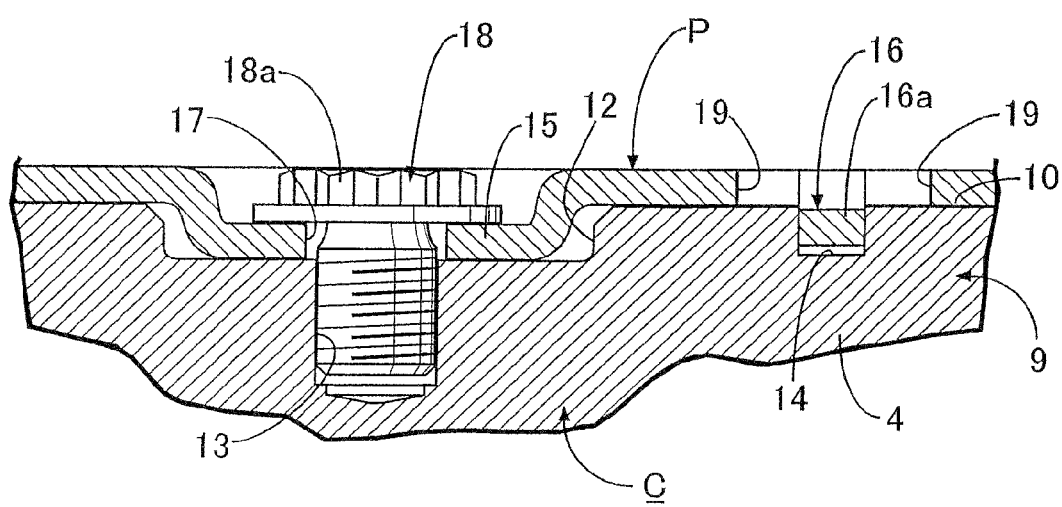
FIG. 3 is an enlarged sectional view along line 3-3 in FIG. 2. (first embodiment)
Figure 4:
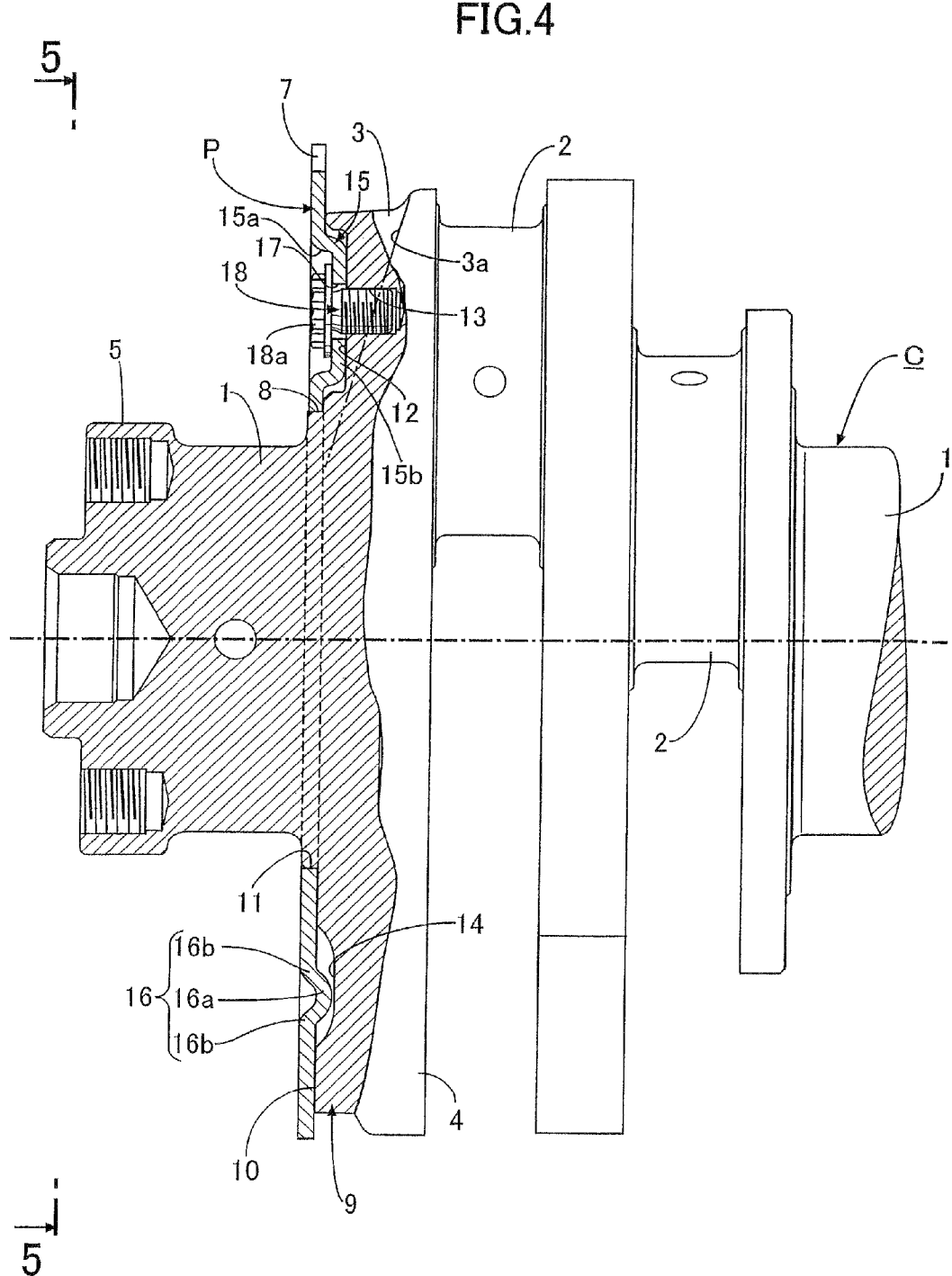
FIG. 4 is a sectional side view of an essential part of a crankshaft for an internal combustion engine equipped with a pulser plate mounting structure related to a second embodiment of the present invention. (second embodiment)
Figure 5:
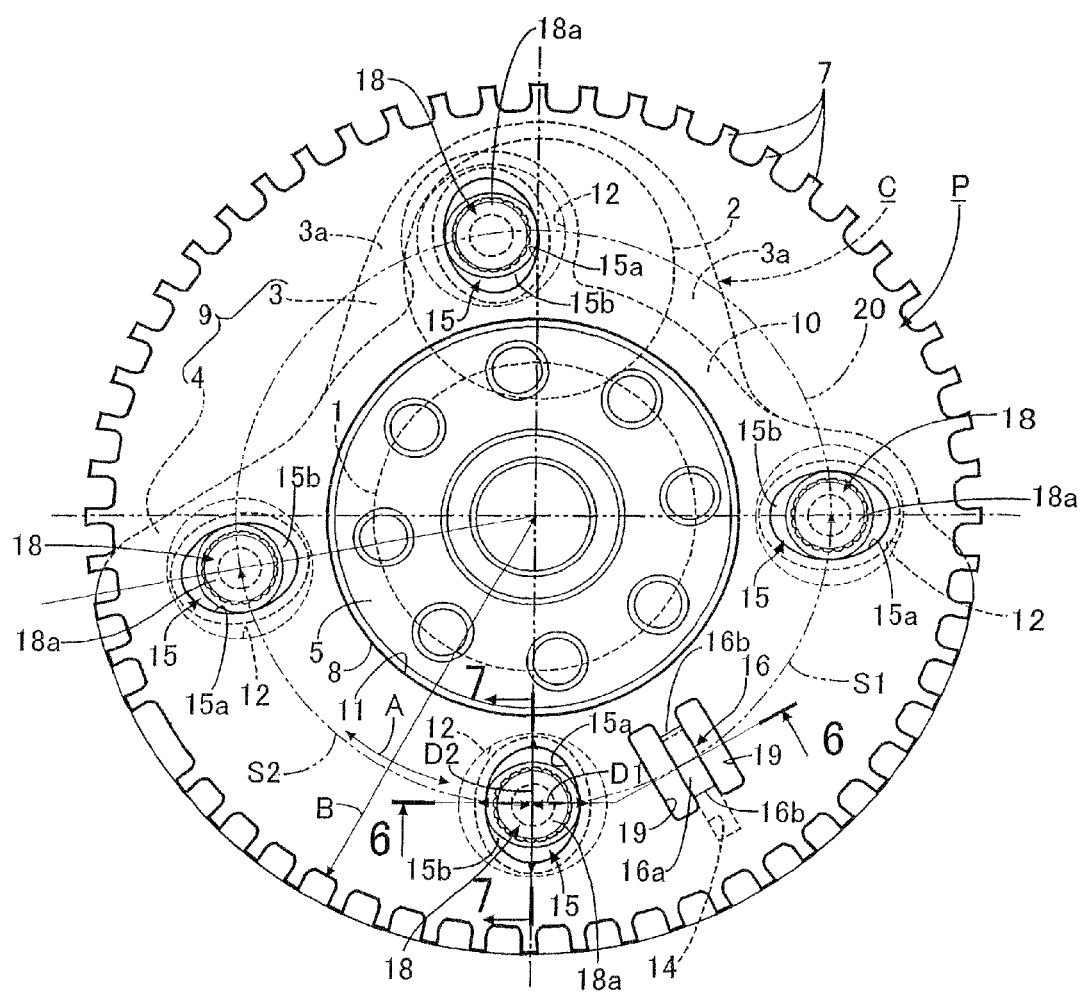
FIG. 5 is a view from arrow 5 in FIG. 4. (second embodiment)
Figure 6:
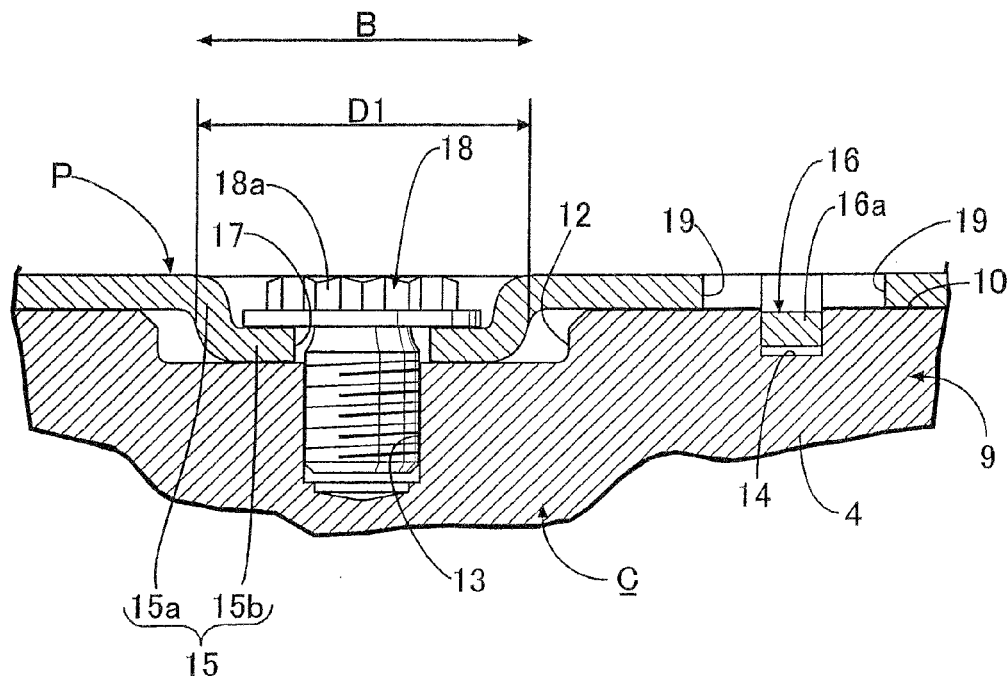
FIG. 6 is an enlarged sectional view along line 6-6 in FIG. 5. (second embodiment)

A first embodiment shown in FIG. 1 to FIG. 3 is now explained. In FIG. 1 and FIG. 2, a crankshaft C is for a multicylinder internal combustion engine and includes a plurality of journals 1 supported by a plurality of main bearings of a crankcase, a plurality of crankpins 2 to which big ends of a plurality of connecting rods are connected, and a plurality of crank arms 3 providing integral connection between adjacent journals 1 and crankpins 2, and a counterweight 4 is connected integrally to each crank arm 3, the counterweight 4 extending in a direction opposite to the crank arm 3 with the central axis of the journal 1 interposed therebetween. Furthermore, a flange 5 is formed at one end of the crankshaft C, a driven member such as a crank pulley or a flywheel being joined to the flange 5 by a bolt.

As shown in FIG. 2, the crank arm 3 is formed so as to be narrow along the peripheral direction, the counterweight 4 is formed so as to be wide along the peripheral direction, and the crank arm 3 and counterweight 4 form a rotating wall portion 9. Mounted on the rotating wall portion 9 on the outermost side on the flange 5 side is a pulser plate P formed by press-forming a magnetic metal plate. This pulser plate P has a large number of projections 7 freely arranged on its outer periphery, and a rotation sensor (not illustrated) installed in an engine main body is disposed so as to face the outer peripheral face.

The rotation sensor includes in its detection part a Hall element and a magnet; when the pulser plate P rotates together with the crankshaft C, magnetic variation within the rotation sensor is converted into an electrical signal by the Hall element, which then by computation gives a rotational position, a rotational speed, a rotational acceleration, etc. of the crankshaft C.

The structure in which the pulser plate P is mounted on the rotating wall portion 9 of the crankshaft C is now explained by reference to FIG. 1 to FIG. 3.

As shown in FIG. 1, formed on the outer end face of the rotating wall portion 9 on the outermost side are an annular positioning step 8 that has a larger diameter than that of the flange 5 and that is concentric with the journal 1, and a mounting face 10 that extends radially from the base of the annular positioning step 8 toward the crank arm 3 and the counterweight 4. An oblique face 3a is formed on opposite side parts of an outer side face of the crank arm 3 along the direction of rotation in order to thin the crank arm 3, and because of this the mounting face 10 is still narrower on the crank arm 3 side than on the counterweight 4 side.

As shown in FIG. 1 and FIG. 2, a plurality (4 in the illustrated example) of recesses 12 having an identical shape (a circular shape in the illustrated example) are provided in the mounting face 10 so as to be arranged in the peripheral direction. In this arrangement, the four recesses 12 are arranged so that gaps S1 and S2 in the peripheral direction between at least one recess 12 and other recesses 12 on opposite sides of said one recess 12 are different from each other. In the case of the illustrated example, the four recesses 12 are arranged so that gaps in the peripheral direction between adjacent recesses 12 on an imaginary circle 20 concentric with the journal 1 are all different from each other. A threaded hole 13 is formed in a center part of each of these four recesses 12. Furthermore, a key groove 14 is formed in a predetermined location of the mounting face 10 on the counterweight 4 side. In this arrangement, the key groove 14 is disposed so that its longitudinal direction is along a radius of the pulser plate P.

A positioning hole 11 is formed in a center part of the pulser plate P, the annular positioning step 8 being fitted into the positioning hole 11, and four bottomed cylindrical bosses 15 are formed on the pulser plate P so as to surround the positioning hole 11, the bosses 15 being fitted into the four recesses 12. A bolt hole 17 corresponding to the threaded hole 13 of each recess 12 is provided in the bottom of each boss 15.

Moreover, a key portion 16 that engages with the key groove 14 is integrally formed with the pulser plate P. This key portion 16 is formed from an arched band-shaped portion 16a projecting in an arched shape from the pulser plate P on one end face side thereof and a pair of connecting portions 16b providing integral connection between the pulser plate P and opposite ends of the arched band-shaped portion 16a. The arched band-shaped portion 16a is disposed so that, in the same way as the key groove 14, its longitudinal direction is along a radial direction of the pulser plate P, and it is fitted between opposite inner side faces of the key groove 14 (see FIG. 3). When this arched band-shaped portion 16a is closely fitted into the key groove 14, all the bosses 15 of the pulser plate P are loosely fitted into the respective recesses 12 of the mounting face 10.

When forming the key portion 16, the pulser plate P is stamped so as to form a pair of long holes 19 (see FIG. 2) so that opposite side faces of the key portion 16 face them, the arched band-shaped portion 16a interposed between the two long holes 19 is subsequently press-formed in an arched shape in the direction in which the boss 15 projects, and by so doing forming of the arched band-shaped portion 16a can easily be carried out without resistance from the pulser plate main body.

The operation of this embodiment is now explained.

When mounting the pulser plate P on the mounting face 10 of the rotating wall portion 9, the positioning hole 11 of the pulser plate P is first fitted onto the annular positioning step 8 of the rotating wall portion 9 from the flange 5 side of the crankshaft C. In this process, while engaging the key portion 16 of the pulser plate P with the key groove 14 of the mounting face 10 and fitting each boss 15 of the pulser plate P into the corresponding recess 12 of the mounting face 10, the pulser plate P is superimposed on the mounting face 10. Subsequently, screwing and tightening the bolt 18 inserted through each bolt hole 17 into the threaded hole 13 enables the pulser plate P to be mounted accurately at a fixed position of the mounting face 10. In this arrangement, a head portion 18a of each bolt 18 is housed within the corresponding boss 15 and does not project from the outer end face of the pulser plate P, and it is therefore possible to position the pulser plate P in the proximity of the crankcase inner wall.

Since the key portion 16 of the pulser plate P is formed from the arched band-shaped portion 16a, which projects in an arched shape from the pulser plate P on one end face side thereof and engages with the key groove 14, and the pair of connecting portions 16b, which provide integral connection between the pulser plate P and opposite ends of the arched band-shaped portion, it is doubly supported on the pulser plate P, thus providing high rigidity. It is therefore possible by cooperation with the key groove to enhance the precision with which the pulser plate P is positioned in the peripheral direction relative to the mounting face 10, that is, the crankshaft C. Moreover, the doubly-supported key portion 16 does not have a sharp extremity, after press-forming it is unnecessary to carry out a finishing process such as chamfering, and the productivity of the pulser plate P can be improved.

In particular, since the key groove 14 and the arched band-shaped portion 16a, which are fitted together, are disposed along the radial direction of the pulser plate P, side faces of the key groove 14 and the arched band-shaped portion 16a extending in the radial direction of the pulser plate P abut against each other over a wide area, thus enabling a predetermined peripheral position of the pulser plate P relative to the crankshaft C to be maintained more accurately.

Furthermore, with regard to the mounting face 10, as described above, since the counterweight 4 side thereof is wider than the crank arm 3 side thereof, when the key groove 14 is formed in the mounting face 10 on the counterweight 4 side, the position at which it is formed can be selected from a wide area, the degree of freedom in design is high, and this is convenient when positioning the pulser plate P. Moreover, when forming the key groove 14, since it is not necessary to thicken the mounting face 10, the productivity is good, and it is possible to prevent the weight balance from being lost due to the crankshaft C being thickened.

Moreover, since the parts for securing the pulser plate P and the rotating wall portion 9 by the bolts 18, that is, the recesses 12 and the bosses 15, are provided at a plurality of locations arranged in the peripheral direction of the pulser plate P, and at least one location of the securing parts 12 and 15 and the other locations of the securing parts 12 and 15 that are adjacent on opposite sides of said one location of the securing parts 12 and 15 are disposed so that gaps S1 and S2 in the peripheral direction are different from each other, the position for mounting the pulser plate P on the rotating wall portion 9 is limited to one location, misassembly can be prevented, and it is therefore possible to prevent the key portion 16 from being damaged by misassembly.

As hereinbefore described, securing of the pulser plate P and the rotating wall portion 9 by the bolts 18 may be carried out in at least two locations, and if this is carried out simply in two locations, changing the gaps in the peripheral direction on opposite sides between the two locations of the securing parts enables misassembly to be prevented.

Embodiment 2

A second embodiment of the present invention shown in FIG. 4 to FIG. 7 is now explained.

Each boss 15 of a pulser plate P has a bottomed elliptical tubular shape, and an elliptical tubular portion 15a thereof is disposed so that its minor axis D1 is directed in a peripheral direction A of the pulser plate P and its major axis D2 is directed in a radial direction B of the pulser plate P.

Since the press-formed pulser plate P is relatively thin, when the torque of a crankshaft C is varying while the engine is running, intense vibration sometimes occurs in a plate-shaped portion between adjacent bosses 15, and this vibration of the plate-shaped portion causes stress concentrated in a peripheral edge portion of the tubular portion 15a of each boss 15, but in this second embodiment, since the tubular portion 15a of each boss 15 is formed as the elliptical tubular portion 15a in which the minor axis D1 is directed in the peripheral direction A of the pulser plate P and the major axis D2 is directed in the radial direction B of the pulser plate P, the vibration of the plate-shaped portion between the bosses 15 of the pulser plate P is transmitted to a peripheral edge portion of the elliptical tubular portion 15a in a section of the major axis D2, and stress due to the vibration is therefore dispersed widely in the peripheral edge portion of the elliptical tubular portion 15a in the section of the major axis D2, thus enhancing the durability of the area around each boss 15. In particular, since the change in curvature of the ellipse of the elliptical tubular portion 15a is very smooth, dispersion of stress is ideal, and the durability of the area around each boss 15 can be enhanced effectively.

In addition, this second embodiment also has an arrangement that can attain the same operational effects as in the first embodiment; portions in FIG. 4 to FIG. 7 corresponding to those in the first embodiment are denoted by the same reference numerals and symbols, and duplication of the explanation is omitted.

Embodiment 3

Figure 8:
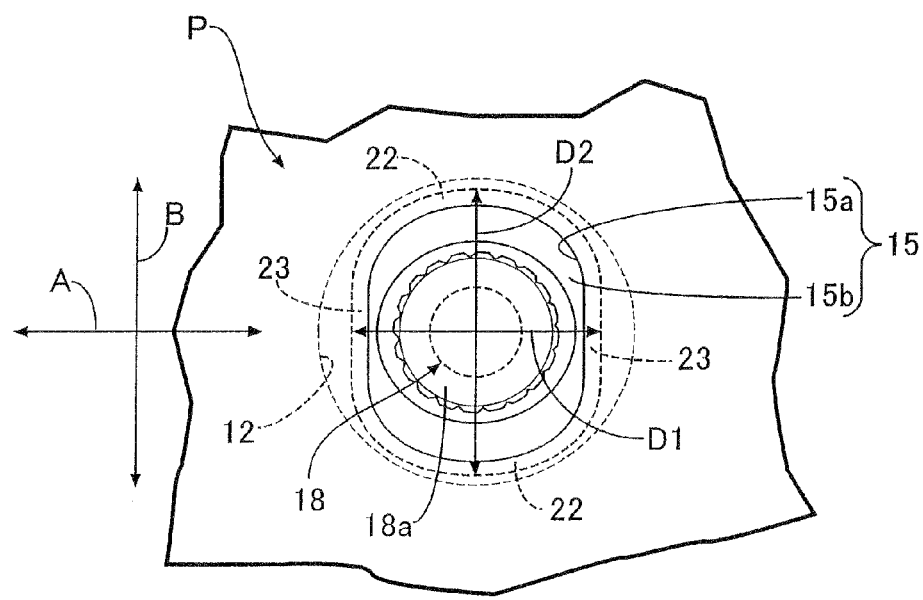
FIG. 8 is an enlarged view, corresponding to an essential part of FIG. 5, showing a third embodiment of the present invention. (third embodiment)

A third embodiment of the present invention shown in FIG. 8 is now explained.

In the third embodiment, a tubular portion 15a of a boss 15 of a pulser plate P is formed so as to have an oval cross-section in which a pair of arc-shaped wall portions 22 facing each other across a gap corresponding to a major axis D2 and a pair of straight-line wall portions 23 facing each other across a gap corresponding to a minor axis D1 are continuously connected. In this arrangement, the tubular portion 15a of the boss 15 is disposed in the same manner as in the preceding embodiment so that the minor axis D1 is directed in a peripheral direction A of the pulser plate P and the major axis D2 is directed in a radial direction B of the pulser plate P. The arrangement is otherwise the same as that of the second embodiment above; portions in FIG. 8 corresponding to those in the second embodiment are denoted by the same reference numerals and symbols, and duplication of the explanation is omitted.

In accordance with this third embodiment, substantially the same operational effects as those of the second embodiment can be exhibited.

Embodiment 4

Figure 9:
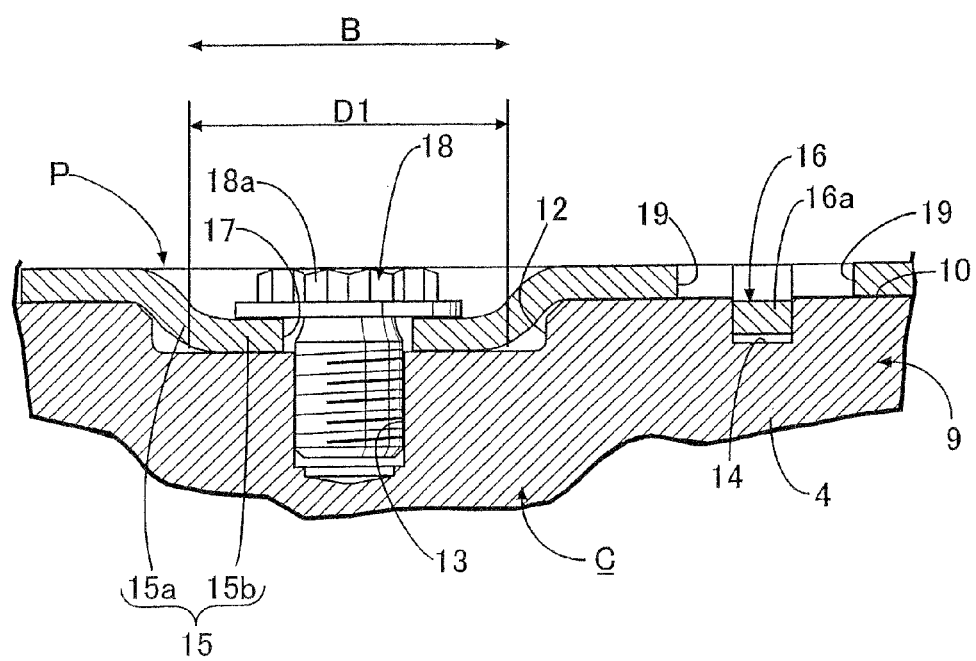
FIG. 9 is a view, corresponding to FIG. 3, showing a fourth embodiment of the present invention. (fourth embodiment)
Figure 10:
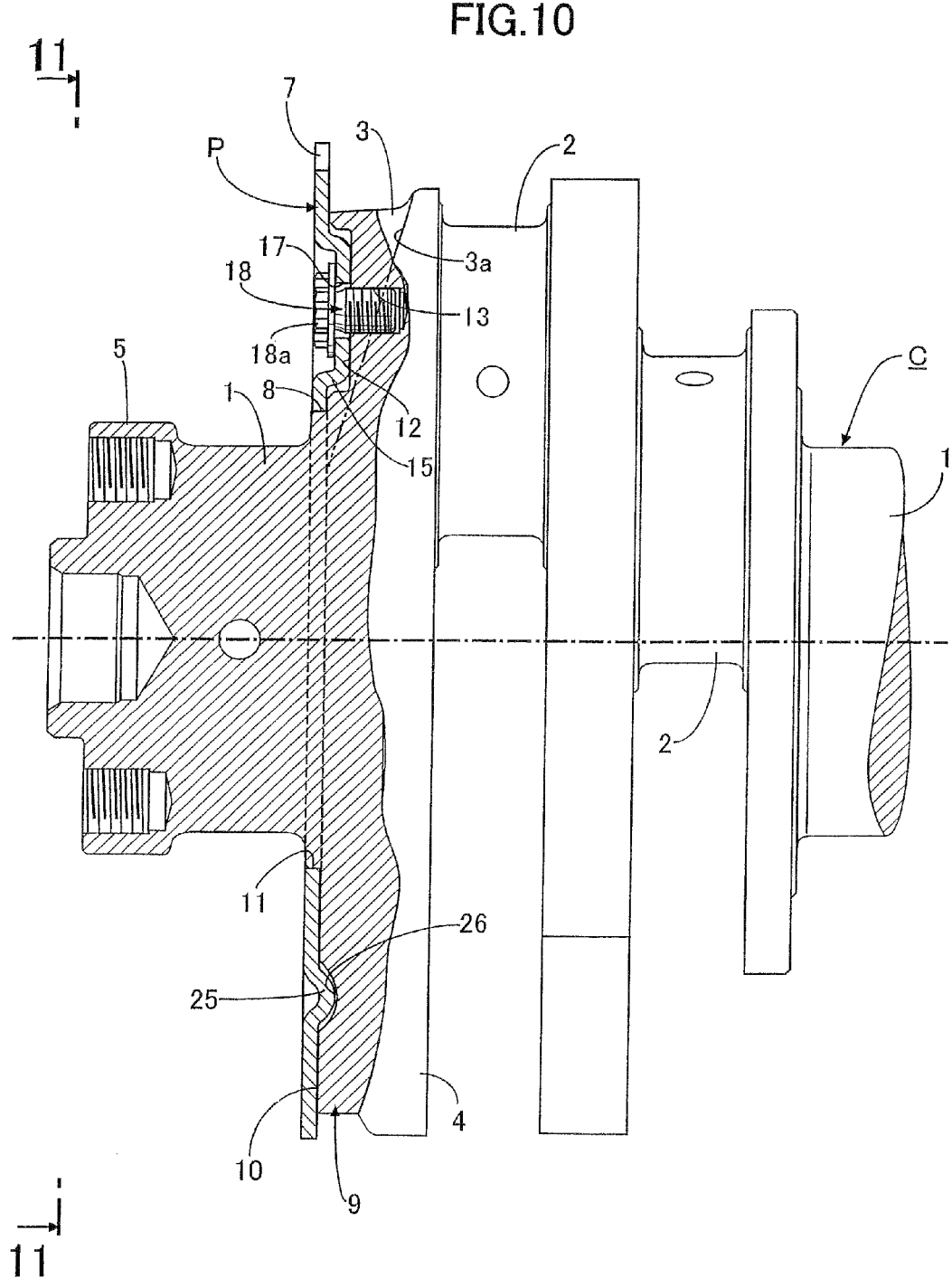
FIG. 10 is a sectional side view of an essential part of a crankshaft for an internal combustion engine equipped with a pulser plate mounting structure related to a fifth embodiment of the present invention. (fifth embodiment)

A fourth embodiment of the present invention shown in FIG. 9 is now explained.

Figure 7:
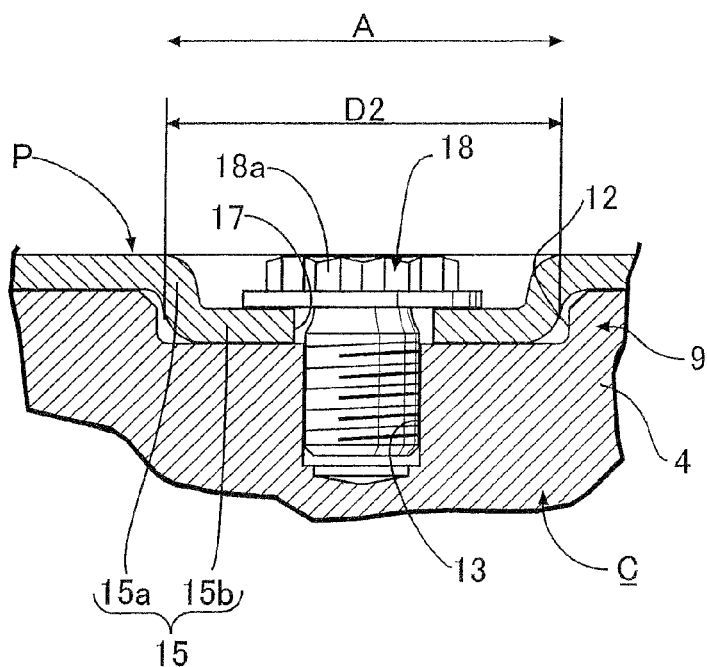
FIG. 7 is an enlarged sectional view along line 7-7 in FIG. 5. (second embodiment)

In the fourth embodiment, a bent portion connected to opposite ends of an elliptical tubular portion 15a of a boss 15 of a pulser plate P is formed so that its curvature is smaller on a minor axis D1 side than on a major axis D2 side (see FIG. 7). The arrangement is otherwise the same as that of the second embodiment above; portions in FIG. 9 corresponding to those in the second embodiment are denoted by the same reference numerals and symbols, and duplication of the explanation is omitted.

In accordance with the fourth embodiment, when intense vibration occurs in the plate-shaped portion between adjacent bosses 15 of the pulser plate P, stress concentrated in particular on the minor axis D1 side of the boss 15, that is, on the peripheral edge portion in the peripheral direction B side of the pulser plate P, can be dispersed more widely, and the durability of the area around each boss 15 can be further enhanced.

Embodiment 5

A fifth embodiment of the present invention shown in FIG. 10 to FIG. 15 is now explained.

In the same manner as in the first embodiment, formed on an outer end face of a rotating wall portion 9 on the outermost side of a crankshaft C are an annular positioning step 8 that has a larger diameter than that of a flange 5 and that is concentric with a journal 1, and a mounting face 10 that extends in a radial direction from the base of the annular positioning step 8 toward a crank arm 3 and a counterweight 4. A plurality (4 in the illustrated example) of recesses 12 having an identical shape (a circular shape in the illustrated example) are provided in this mounting face 10 so as to be arranged in the peripheral direction. In this arrangement, the four recesses 12 are arranged so that gaps S1 and S2 in the peripheral direction between at least one recess 12 and other recesses 12 on opposite sides of said one recess 12 are different from each other. The four recesses 12 are arranged so that gaps in the peripheral direction between adjacent recesses 12 on an imaginary circle 20 concentric with the journal 1 are all different from each other.

Formed on a pulser plate P is an annular rib 25 that follows the imaginary circle 20 and projects from one end face side of the pulser plate P. Four bosses 15 arranged on the imaginary circle 20 are therefore connected via the rib 25. In this arrangement, a height H1 of the rib 25 is set so as to be smaller than a height H2 of the boss 15, and as a result there is a step e between the rib 25 and the boss 15. Accordingly, the depth of a rib-housing groove 26 of the mounting face 10 is set so as to be smaller than the depth of the recess 12 for housing the boss 15.

The rib 25 projects from an end face of the pulser plate P on the mounting face 10 side of the rotating wall portion 9, and the rib-housing groove 26 for housing the rib 25 is formed in the mounting face 10.

Figure 13:
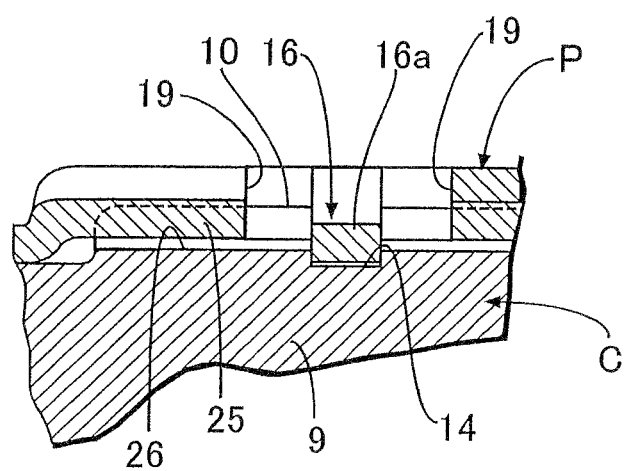
FIG. 13 is an enlarged sectional view along line 13-13 in FIG. 11. (fifth embodiment)
Figure 14:
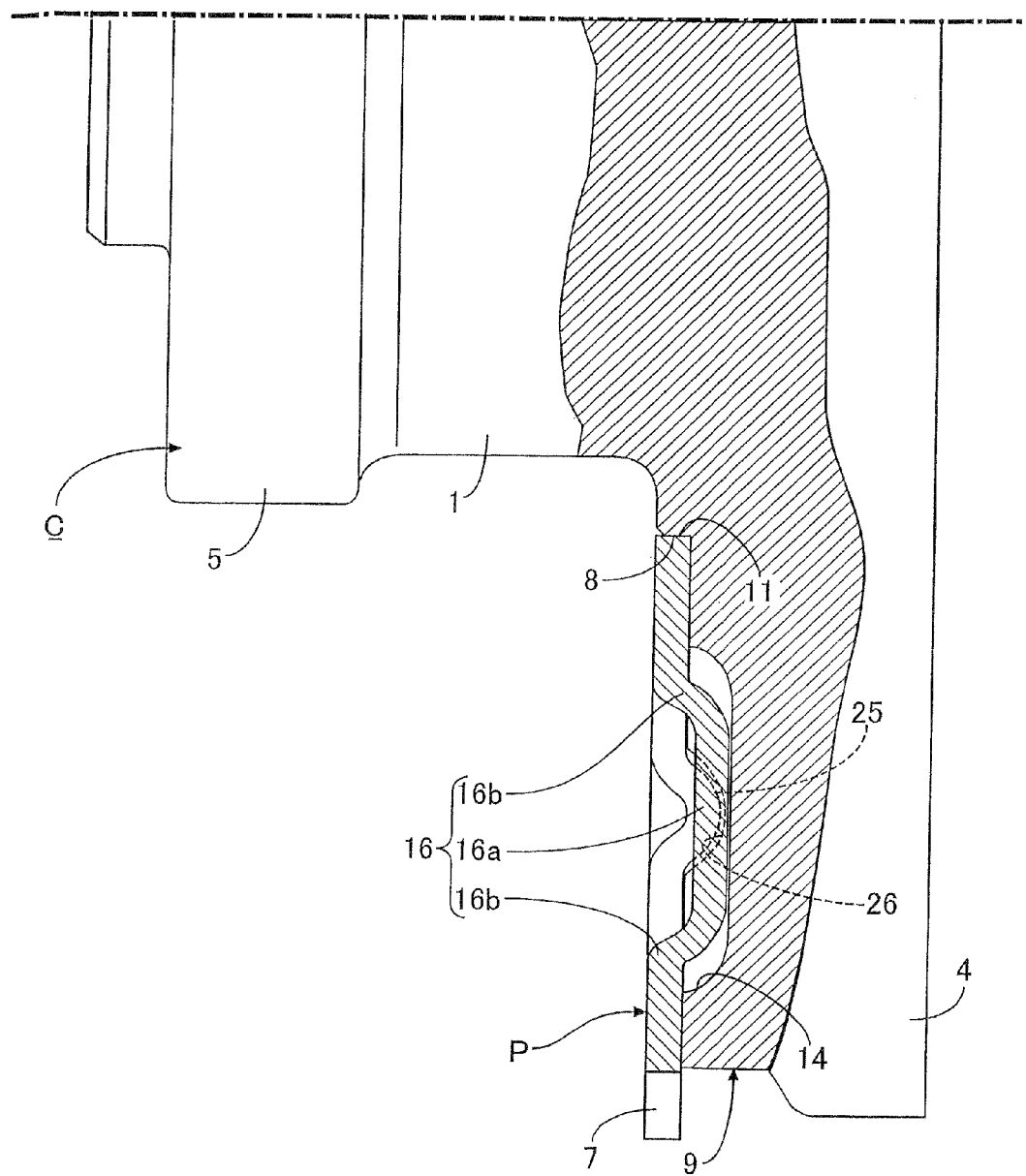
FIG. 14 is an enlarged sectional view along line 14-14 in FIG. 11. (fifth embodiment)

As shown in FIG. 13 and FIG. 14, the groove width of the rib-housing groove 26 is set so as to be smaller than the length of a key groove 14 in the mounting face 10 so that the rib-housing groove 26 crosses the key groove 14. This enables the key groove 14 and a key portion 16 of the pulser plate P to be reliably engaged with each other regardless of the presence of the rib-housing groove 26, and the function of positioning relative to the pulser plate P to be exhibited.

Figure 11:
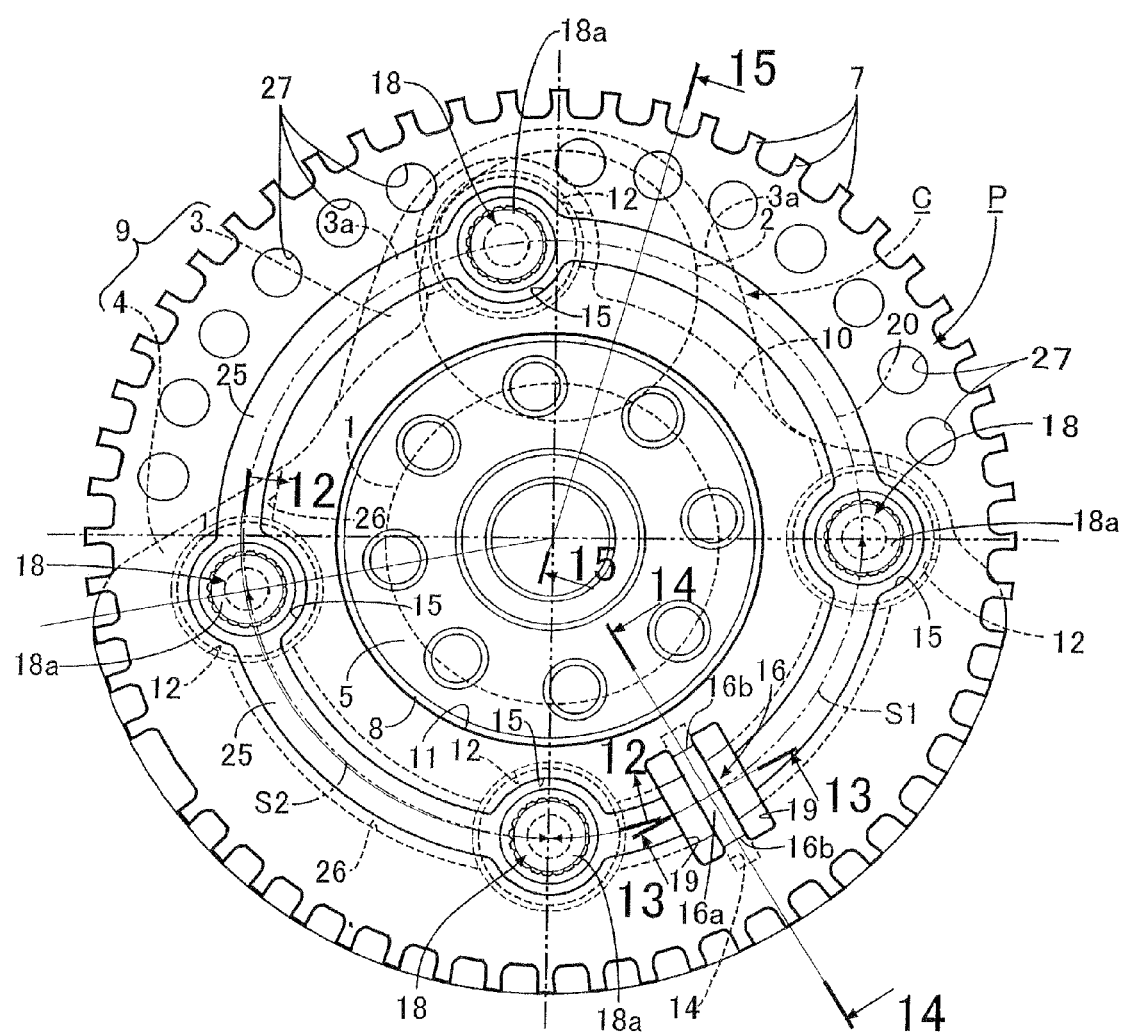
FIG. 11 is a view from arrow 11 in FIG. 10. (fifth embodiment)
Figure 12:
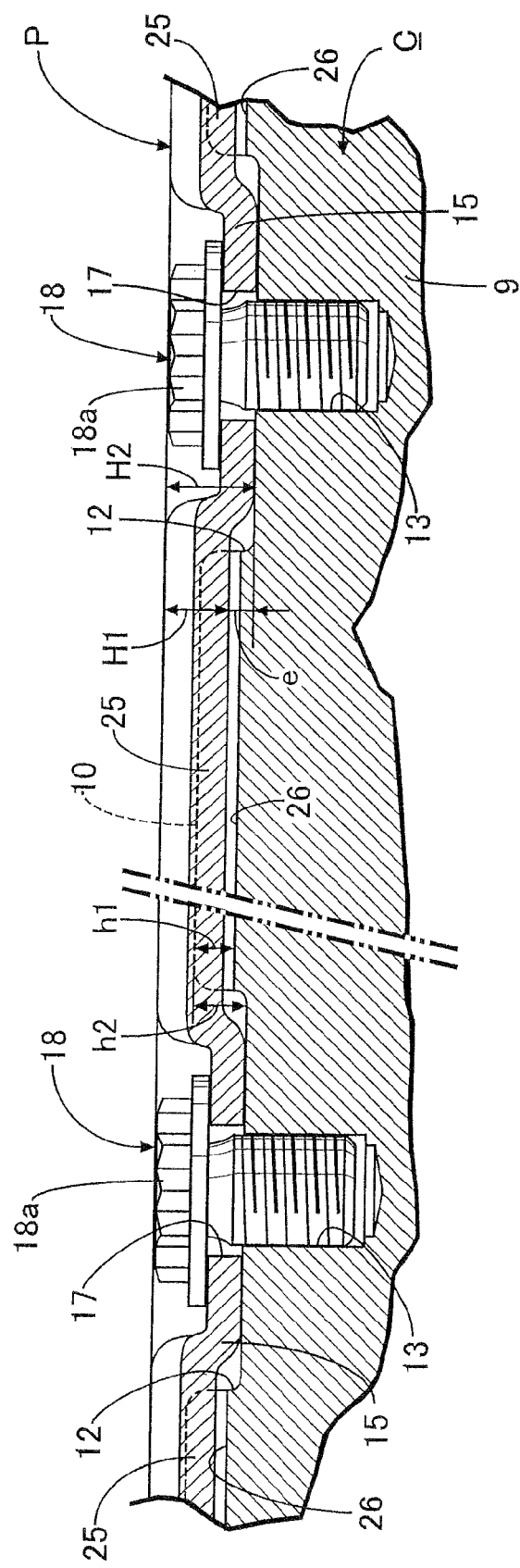
FIG. 12 is an enlarged sectional view along line 12-12 in FIG. 11. (fifth embodiment)
Figure 15:
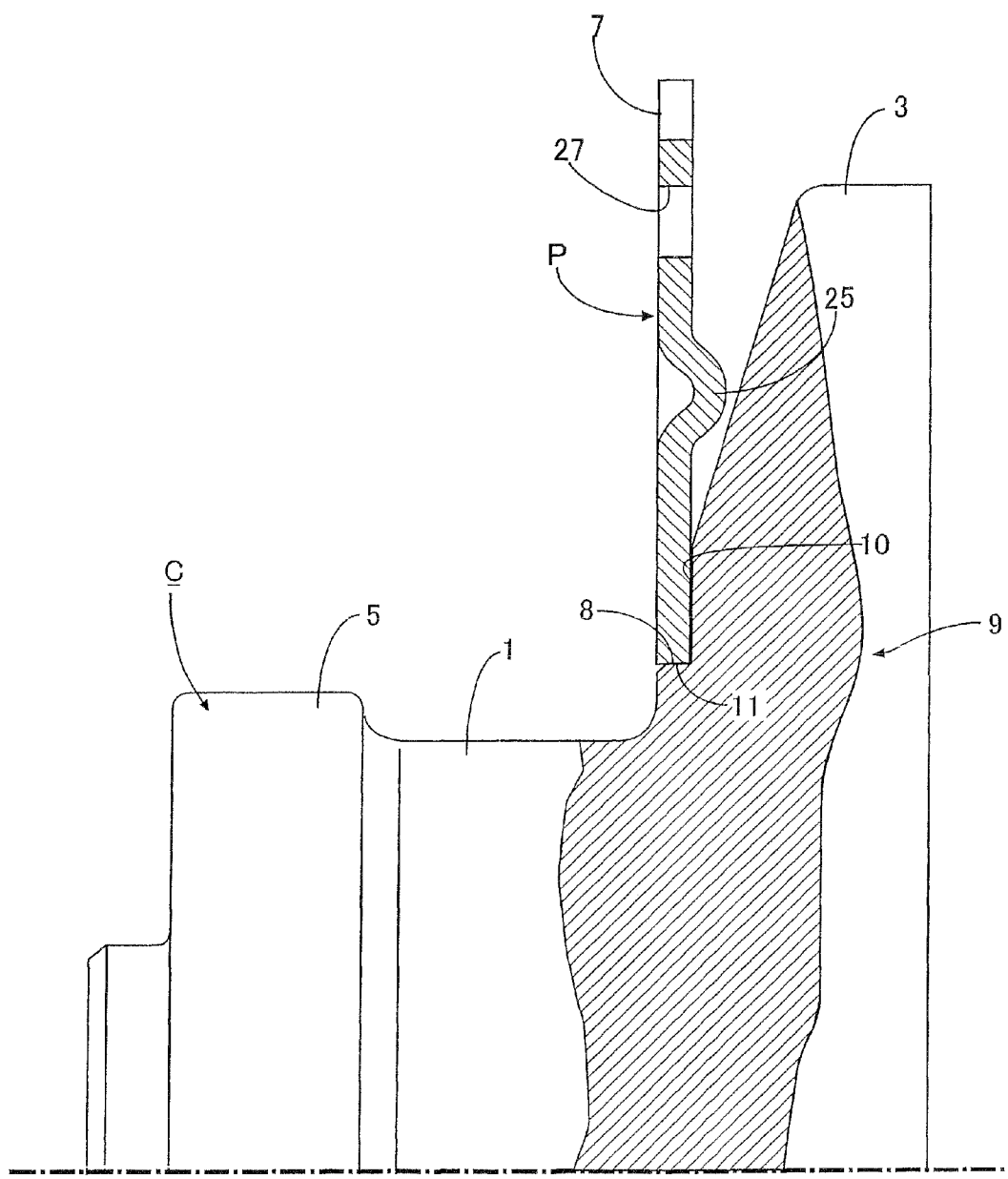
FIG. 15 is an enlarged sectional view along line 15-15 in FIG. 11. (fifth embodiment)

Furthermore, as shown in FIG. 11 and FIG. 15, a plurality of through holes 27 are bored only in a half of the pulser plate P on the crank arm 3 side so as to be aligned in the peripheral direction.

In addition, this fifth embodiment also has an arrangement that can attain the same operational effects as in the first embodiment; portions in FIG. 10 to FIG. 15 corresponding to those in the first embodiment are denoted by the same reference numerals and symbols, and duplication of the explanation is omitted.

Since the press-formed pulser plate P is relatively thin, when the torque of a crankshaft C is varying while an engine is running, intense vibration tends to occur in a plate-shaped portion between adjacent bosses 15, but in accordance with this fifth embodiment, since the rib 25 is formed on the pulser plate P so as to project from one end face thereof and extend in the peripheral direction, the rigidity of the pulser plate P can be increased by the rib 25. In particular, since the rib 25 has an annular shape extending along the entire periphery of the pulser plate P, the rigidity of the pulser plate P can be increased evenly along the entire periphery thereof, and vibration of the pulser plate P can be suppressed effectively. Moreover, since it is not necessary to specially increase the thickness of the pulser plate P, this contributes to reduction in the weight of the crankshaft C system, and when the pulser plate P is secured to the rotating wall portion 9 by a bolt 18, it can be carried out with few securing locations, such as only one location on the crank arm 3 side, where the mounting area is restricted. That is, since it is not necessary to specially increase the number of securing locations, the degree of freedom in design is high.

Since the rib 25 projects from the end face of the pulser plate P on the rotating wall portion 9 side, and the rib-housing 26 for housing the rib 25 is formed in the mounting face 10 of the rotating wall portion 9, the rib 25 does not project from the outer end face of the pulser plate P, and it is therefore possible to position the pulser plate P in the proximity of a crankcase inner wall.

Furthermore, a head portion 18a of each bolt 18 housed in the recess 12 is housed within the corresponding boss 15 and does not project from the outer end face of the pulser plate P, and it is therefore possible to position the pulser plate P in the proximity of the crankcase inner wall.

Moreover, since the rib 25 is formed in an annular shape and provides a connection between a plurality of high rigidity bosses 15, the rigidity of the pulser plate P can be further increased more effectively by cooperation between the annular rib 25 and the plurality of bosses 15. In this arrangement, forming the step e between the rib 25 and the boss 15 by setting the height H1 of the rib 25 so as to be smaller than the height H2 of the boss 15 is effective in enhancing the rigidity of the connecting portion between the rib 25 and the boss 15. Accompanying this, setting the depth of the rib-housing groove 26 so as to be smaller than that of the recess 12 for housing the boss 15 is effective in enabling the rib-housing groove 26 and the recess 12 to be cut in the mounting face 10 of the rotating wall portion 9 without them interfering with each other.

That is, when cutting the rib-housing groove 26 and the recess 12, whichever is machined first, it does not interfere with the other one. If the rib-housing groove 26 were deeper than the recess 12, the rib-housing groove 26 could not be machined in one step due to interference from the base of the recess 12. Furthermore, since the rib-housing groove 26 follows the annular rib 25, this can easily be machined by rotating the crankshaft C around the journal 1.

Moreover, due to the rigidity of the pulser plate P being enhanced by the annular rib 25, it becomes possible to bore the plurality of through holes 27 in the pulser plate P in order to reduce the weight thereof. In this process, providing the plurality of through holes 27 only in the half of the pulser plate P on the crank arm 3 side enables the weight of the half on the crank arm 3 side to be reduced by these through holes 27, the counterweight 4 can be thinned by a corresponding amount, and the weight of the crankshaft C system can be reduced.

Embodiment 6

Figure 16:
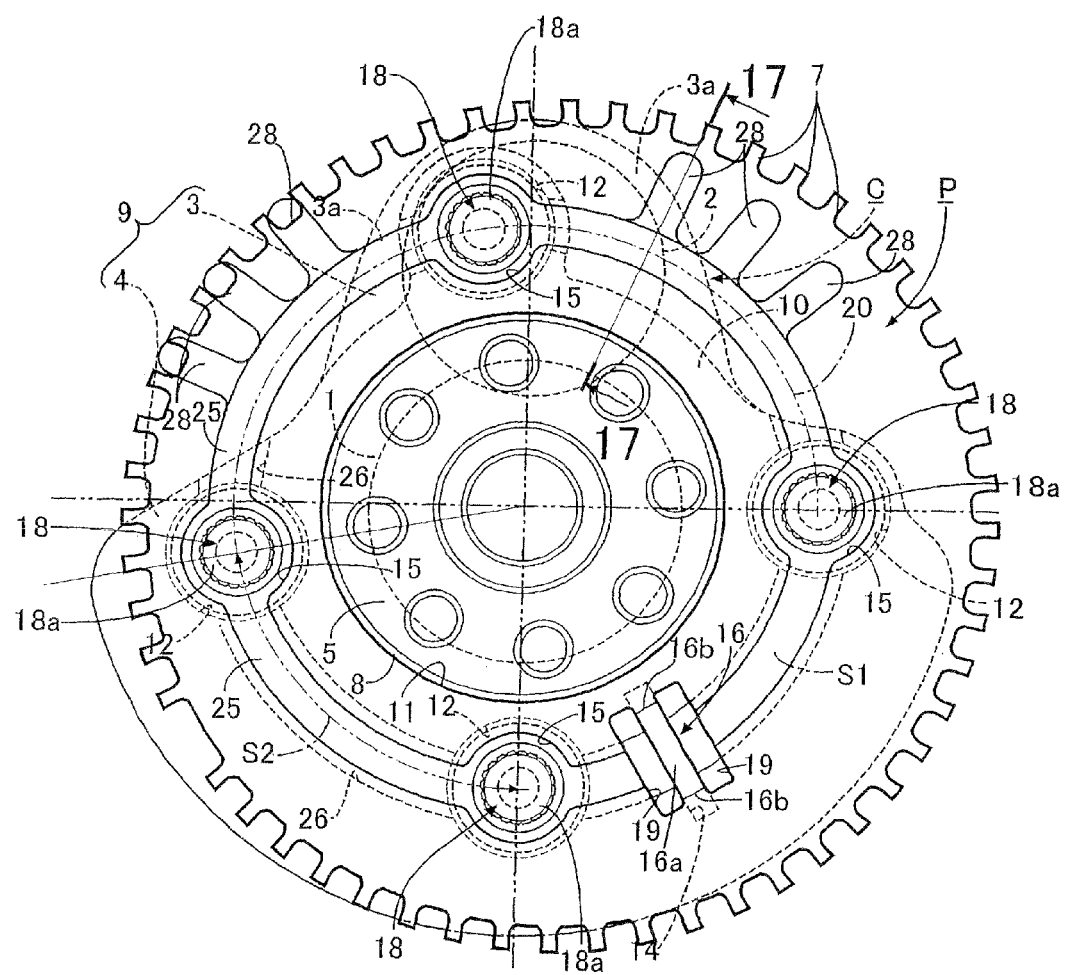
FIG. 16 is a view, corresponding to FIG. 11, showing a sixth embodiment of the present invention. (sixth embodiment)
Figure 17:
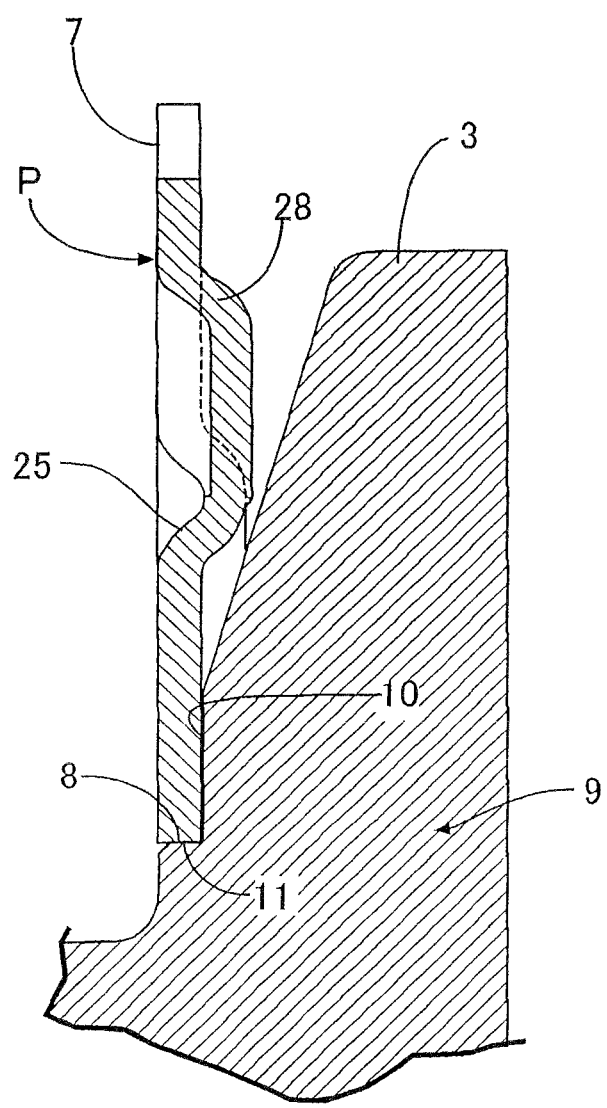
FIG. 17 is a sectional view along line 17-17 in FIG. 16. (sixth embodiment)

A sixth embodiment of the present invention shown in FIG. 16 and FIG. 17 is now explained.

In this sixth embodiment, a plurality of ribs 28 extending radially from an annular rib 25 are formed in a portion of a pulser plate P protruding from a mounting face 10 on a crank arm 3 side. The arrangement is otherwise the same as that of the fifth embodiment except that the pulser plate P is not provided with the through holes 27 as in the preceding embodiment; portions in FIG. 16 and FIG. 17 corresponding to those in the fifth embodiment are denoted by the same reference numerals and symbols, and duplication of the explanation is omitted.

In accordance with the sixth embodiment, by cooperation between the annular rib 25 and the radial ribs 28, the rigidity in particular of the portion of the pulser plate P protruding from the mounting face 10 on the crank arm 3 side is enhanced, thus preventing effectively the portion from vibrating.

The present invention is not limited to the above-mentioned embodiments, and may be modified in a variety of ways as long as the modifications do not depart from the spirit and scope thereof. For example, in the embodiments above, the parts for securing the pulser plate P to the rotating wall portion 9 by the bolt 18 may be in at least two locations, and when there are simply two locations, misassembly can be prevented by differentiating gaps in the peripheral direction on opposite sides of the two locations of the securing parts. Furthermore, in the fifth and sixth embodiments, the annular rib 25 may be formed from two or more concentric ribs, and they may be disposed radially inside and outside the plurality of annularly aligned bosses 15. Moreover, the key portion 16 may be provided on the inside or the outside of the annular rib 25 so as not to cross the annular rib 25, and this is effective in enhancing the reinforcing function of the rib 25.

The invention claimed is:

1. A pulser plate mounting structure, comprising:

a key groove formed in an end face of a rotating wall portion formed from a crank arm and a counterweight of a crankshaft for an internal combustion engine, and a key portion for engaging with the key groove, the key portion being formed on a pulser plate that is superimposed on the end face, wherein the pulser plate is secured to the rotating wall portion by a securing member, the pulser plate including a pair of holes bored in the pulser plate such that each of the pair of holes extends in a peripheral direction of the pulser plate, wherein the key portion is formed from an arched band-shaped portion projecting in an arched shape from the pulser plate on one end face side thereof and engaging with the key groove and sandwiched between the pair of holes, and a pair of connecting portions for providing integral connection between the pulser plate and opposite ends of the arched band-shaped portion, which engage with each other, are disposed so that longitudinal directions thereof are along a radius of the pulser plate, and wherein opposite side faces of the arched band-shaped portion extending in the radial direction of the pulser plate are fitted to opposite inner faces of the key groove, respectively, the opposite side faces of the arched band-shaped portion facing the holes bored in the pulser plate, and wherein there are a plurality of locations at which there are securing parts for securing the pulser plate to the rotating wall portion by the securing member, the locations being aligned in a peripheral direction of the pulser plate, and gaps in a peripheral direction between at least one location of the securing parts and other locations of the securing parts adjacent to opposite sides of the at least one location of the securing parts are made to be different from each other.

2. The pulser plate mounting structure according to claim 1, wherein the key groove is formed in the end face of the counterweight.

3. The pulser plate mounting structure according to claim 1, wherein a plurality of recesses are formed in the end face of the rotating wall portion so as to be aligned in a peripheral direction thereof, a plurality of bottomed tubular bosses housed in the plurality of recesses are formed on the pulser plate, these bosses being secured to the pulser plate by the securing members, and a tubular portion of the boss is formed in an irregular cylindrical shape so that a minor axis (D1) is directed in a peripheral direction of the pulser plate and a major axis (D2) is directed in a radial direction of the pulser plate.

4. The pulser plate mounting structure according to claim 3, wherein the tubular portion of the boss is formed in an elliptical tubular shape.

5. The pulser plate mounting structure according to claim 3, wherein the curvature of a bent portion connected to opposite ends of the tubular portion of the boss is set so as to be smaller on the minor axis (D1) side than on the major axis (D2) side.

6. The pulser plate mounting structure according to claim 1, wherein a rib is formed on the pulser plate, the rib projecting on one end face side thereof and extending in a peripheral direction.

7. The pulser plate mounting structure according to claim 6,
wherein the rib projects from an end face of the pulser plate on the rotating wall portion side, and a rib-housing groove for housing the rib is formed in the rotating wall portion.

8. The pulser plate mounting structure according to claim 6,
wherein the rib is formed in an annular shape so as to extend along the entire periphery of the pulser plate.

9. The pulser plate mounting structure according to claim 6,
wherein a plurality of recesses are formed in the end face of the rotating wall portion so as to be aligned in a peripheral direction thereof, a plurality of bottomed tubular bosses are formed on the pulser plate, the bosses being housed in the plurality of recesses and secured to the pulser plate by the securing members, these bosses) are connected to each other via the annular rib projecting from the end face of the pulser plate on the rotating wall portion side, and a rib-housing groove for housing the annular rib is formed in the end face of the rotating wall portion.

10. The pulser plate mounting structure according to claim 6,
wherein a height (H1) of the rib is set so as to be smaller than a height (H2) of the boss, and a depth (h1) of the rib-housing groove is set so as to be smaller than a depth (h2) of the recess for housing the boss.

11. The pulser plate mounting structure according to claim 6,
wherein a through hole is bored in a half of the pulser plate on the crank arm side.

12. A pulser plate mounting structure, comprising:
a key groove formed in an end face of a rotating wall portion formed from a crank arm and a counterweight of a crankshaft for an internal combustion engine, and
a key portion for engaging with the key groove, the key portion being formed on a pulser plate that is superimposed on the end face, wherein the pulser plate is secured to the rotating wall portion by a securing member, the pulser plate including a pair of holes bored in the pulser plate such that each of the pair of holes extends in a peripheral direction of the pulser plate,
wherein the key portion is formed from an arched band-shaped portion projecting in an arched shape from the pulser plate on one end face side thereof and engaging with the key groove and sandwiched between the pair of holes, and a pair of connecting portions for providing integral connection between the pulser plate and opposite ends of the arched band-shaped portion, which engage with each other, are disposed so that longitudinal directions thereof are along a radius of the pulser plate, and
wherein opposite side faces of the arched band-shaped portion extending in the radial direction of the pulser plate are fitted to opposite inner faces of the key groove, respectively, the opposite side faces of the arched band-shaped portion facing the holes bored in the pulser plate.

* * * * *